(12) United States Patent
Costello et al.

(10) Patent No.: US 11,869,062 B2
(45) Date of Patent: Jan. 9, 2024

(54) CROSS-ENTITY RECOMMENDATION SERVICES

(71) Applicant: NCR Voyix Corporation, Atlanta, GA (US)

(72) Inventors: Christopher John Costello, Suwanee, GA (US); Matthew Robert Burris, Atlanta, GA (US); Itamar David Laserson, Givat Shmuel (IL); Norman Leonard Trujillo, Frisco, TX (US)

(73) Assignee: NCR Voyix Corporation, Atlanta, GA (US)

( * ) Notice: Subject to any disclaimer, the term of this patent is extended or adjusted under 35 U.S.C. 154(b) by 99 days.

(21) Appl. No.: 17/333,128

(22) Filed: May 28, 2021

(65) Prior Publication Data
US 2022/0383385 A1    Dec. 1, 2022

(51) Int. Cl.
*G06Q 30/00*    (2023.01)
*G06Q 30/0601*    (2023.01)
*G06Q 20/20*    (2012.01)

(52) U.S. Cl.
CPC ......... *G06Q 30/0631* (2013.01); *G06Q 20/20* (2013.01)

(58) Field of Classification Search
None
See application file for complete search history.

(56) References Cited

U.S. PATENT DOCUMENTS

| | | | | |
|---|---|---|---|---|
| 8,117,199 | B2* | 2/2012 | Ghani | G06Q 30/0204 |
| | | | | 705/26.7 |
| 11,157,954 | B1* | 10/2021 | Belanger | G06Q 30/0201 |
| 2014/0180853 | A1* | 6/2014 | Seidel | G06Q 30/0633 |
| | | | | 705/26.8 |
| 2016/0292705 | A1* | 10/2016 | Ayzenshtat | G06Q 30/0204 |
| 2019/0236531 | A1* | 8/2019 | Adato | H04N 23/80 |

* cited by examiner

*Primary Examiner* — Mila Airapetian
(74) *Attorney, Agent, or Firm* — Schwegman Lundberg & Woessner, P.A.

(57) ABSTRACT

A cross-entity and cross-retailer platform is provided that captures transaction data, indexes, and stores the data in a cloud-accessible data store. A service is provided that custom processes retailer and entity-defined workflows based on purchase transactions using the data store. The service also generates and maintains correlations between items, the transactions, geographical locations, retailers, and stores of the retailers. The correlations are provided as timely retail recommendations to the retailers and entities for suggested changes that are likely to optimize purchase transactions. The entities may comprise manufacturers of an item, a supplier of the item, a distributor of the item, and a Consumer Packaging Goods (CPG) company of the item.

11 Claims, 3 Drawing Sheets

CROSS-ENTITY RECOMMENDATION SERVICES

BACKGROUND

Currently, suppliers have limited access to retail sales data for the merchandise that suppliers provide to retailers for sale. The sales data contains valuable information for marketing, product promotions, in-store product positioning, inventory, etc. Suppliers spend a significant amount of time and investment each year trying to obtain what data they can from the retailers. A significant time lag current exists between the time the sales data is generated at the retailers and the time that third-party data service providers are actually able to supply the data to the suppliers (typically, a 4 to 6-week delay).

As a result, suppliers, in the best-case scenarios, receive time lagged sales data with little to no visibility into the their product inventories that are currently in stock with the retailers. Suppliers also are provided no additional information with the sales data that would be extremely valuable to the suppliers, such as retail store-level execution of their product promotions and data that identifies other products, which are frequently purchased with the suppliers products (basket-level insight).

Consequently, suppliers often try to piece together an incomplete view about the conditions under which their products are being sold at the retail stores. A complete data picture would allow a given supplier to determine such things as how much product is actually being sold at the retail stores, what additional products are being purchased with the supplier's products at the retail stores, what product promotions would yield maximum sales, how to maximize/improve the rate of purchase of the supplier's products at the retail stores, etc.

In fact, the quality of the sales data obtained and the untimeliness with which the data is obtained has caused some suppliers to plan and manage product inventories, product promotions, and projected product sales without any retail sales data at all.

SUMMARY

In various embodiments, methods a system for cross-entity recommendation services are presented.

According to an embodiment, a method for operating a cross-entity recommendation service is presented. As an example, transaction data associated with a purchase transaction is received from a retailer. An entity other than the retailer is identified from the transaction data. A correlation is updated or generated based on items identified in the transaction data and further based on other transaction data associated with other purchase transactions of the retailer and of other retailers. A recommendation is sent to the entity based on the correlation.

DETAILED DESCRIPTION

Figure 1:
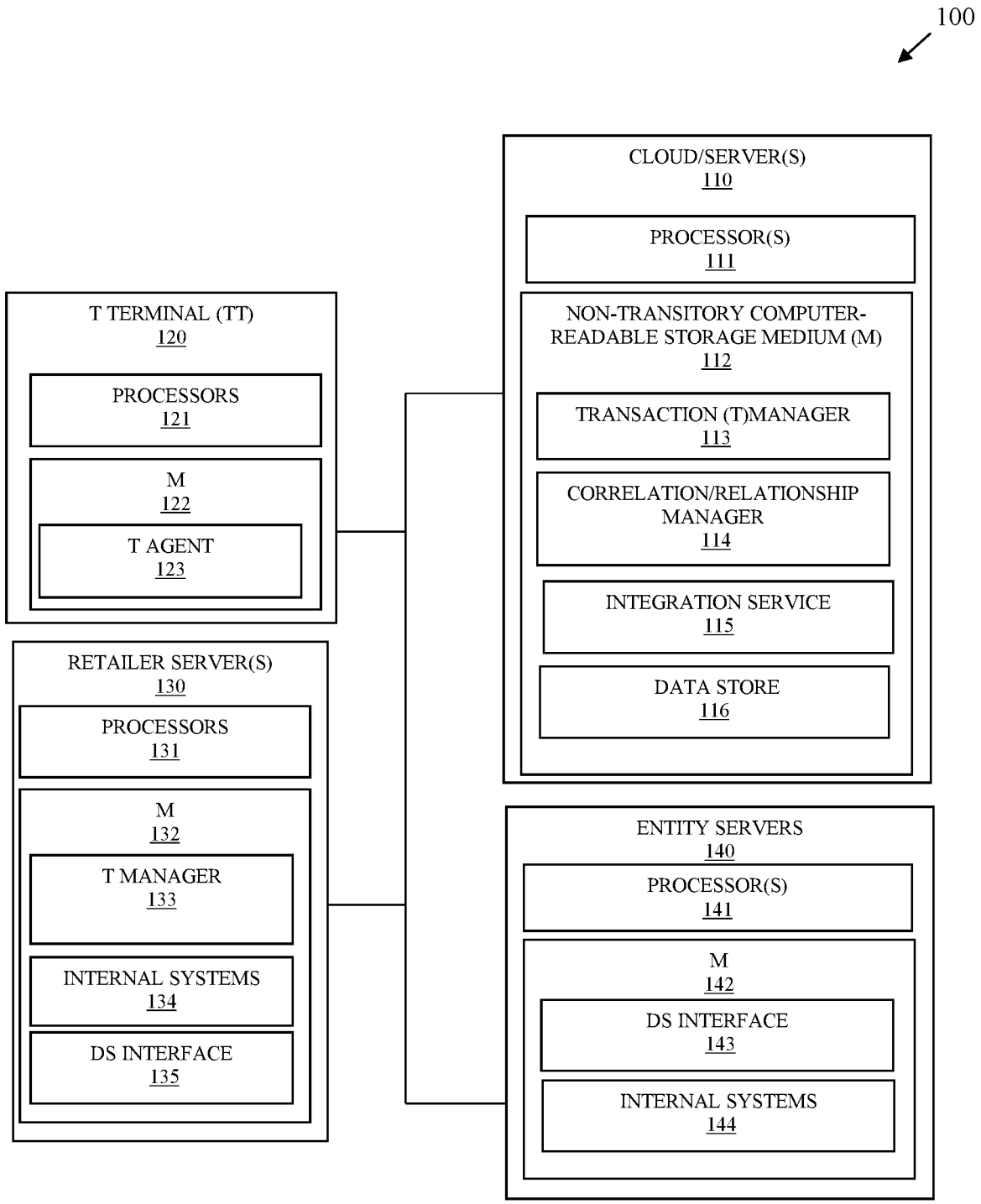
FIG. 1 is a diagram of a system/platform for cross-entity recommendation services, according to an example embodiment.

FIG. 1 is a diagram of a cross-entity system/platform 100 for cross-entity recommendation services, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of the cross-entity recommendation services, presented herein and below.

System/platform 100 (herein after just "system 100") provides a processing environment by which entities (e.g., Consumer Product Goods manufacturers (CPGs), item suppliers, item distributors, and item retailers) can obtain real-time valuable item/product data relationships, correlations, and insights from item/product transactions via a cloud-based service accessible to each of the entities for purposes of modifying and altering decision making by systems of the entities. Further, real-time notifications of item/product transactions are provided to the entities via the service. Transaction data associated with item/product sales are categorized and correlated by entity identifiers, item codes, item/product type, geographical location, time of year (season), and basket contents within a cloud-accessible data store. An integration service interacts with the appropriate entity inventory systems, planning systems, promotions systems, and/or schedule/delivery systems to provide real-time notice of item/product sales, current derived relationships between a basket of other item/products that were purchased with the items/products when sold at a given retailer. This allows the entities to properly account in real time for item/product sales, the relationships, and the correlations for purposes of inventory management, item/product replenishment schedules, item/product manufacture or order schedules, item/product promotions, and item/product delivery schedules.

Moreover, the cloud-based service also provides an analysis and recommendation service that provides recommendations about how to improve item/product sales for a given entity at a given retailer's store based on currently derived relationships and correlations For example, the analysis and recommendation service provides comparisons with respect to a given entity's basket penetration vis-a-vis other entities for a given retail store, a geographical region comprising multiple different retailers, and/or a given retailer comprising multiple retail stores. The analysis and recommendation service also provides an analysis of how seasonal changes alter sales of different product types and how geographical location alters sales performance of various product types.

The term "item" may be used interchangeably and synonymously with the terms "product," "merchandise," and/or "good."

As used herein the term "manufacturer" is used to identify a company that manufactures an item/product. A "supplier" is used to identify a company that supplies the item/product of a manufacturer to a distributor; in some instances, the supplier may also be the manufacturer of the item/product. A Consumer-Packaged Goods (CPG) company is an entity that manufacturers the item/product and then provides the item/product directly to a retailer for resale to a consumer. A distributor is used to identify a company that provides the item/product of a manufacturer (or a supplier that is also the manufacturer) directly to a retailer.

As used herein the term "company" or the term "entity" refers to a manufacturer, a supplier, a CPG, and/or a distributor.

The term "retailer" refers to an organization that resells an item/product directly to the consumer.

A "transaction terminal 120" is a type of device that is used to perform transactions, which may also include a variety of integrated peripheral devices or which may be interfaced to peripheral devices. The peripheral devices may comprise card readers, currency/coin acceptors and dispensers, scanners, weigh scales, integrated scanners with weigh scales, touch displays, cameras, etc.

A consumer device may also be considered a transaction terminal 120 when the consumer device is being operated by a consumer for purposes of performing a transaction, such that in some embodiments, the transaction terminal 120 is a phone, a laptop, a desktop, a tablet, a voice-based network-enabled device (Google® Home®, Amazon® Echo®, etc.), etc.

A retail staff operated device can also be a transaction terminal 120 when a staff member operates the device for purposes of performing a transaction on behalf of a customer. The staff operated device may be a Point-Of-Sale (POS) terminal, a tablet, a phone, a laptop, or a desktop.

In some cases, a consumer performs a self-checkout via a transaction terminal 120 located within a retail store, such that in these situations the transaction terminal 120 is a Self-Service Terminal (SST) or a kiosk.

System 100 comprises a cloud/server 110, a transaction terminal 120, retailer servers 130, and entity servers 140.

Cloud/Server 110 comprises at least one processor 111 and a non-transitory computer-readable storage medium 112. Medium 112 comprises executable instructions for transaction manager 113, a correlation/relationship manager 114, an integration service 115, and a data store interface to a data store 116 (the data store 116 residing in medium 112). The executable instructions when provided to processor 111 from medium 112 cause processor 111 to perform the processing described herein and below with respect to 113-115.

Transaction terminal 120 comprises at least one processor 121 and a non-transitory computer-readable storage medium 122. Medium 122 comprises executable instructions for transaction agent 123. The executable instructions when provided to processor 121 cause processor 121 to perform the processing described herein and below with respect to agent 123.

Each retailer server 130 comprises one or more processors 131 and non-transitory computer-readable storage medium 132. Medium 132 comprises executable instructions for transaction manager 133, internal systems 134, and a data store interface 135. The executable instructions when provided to one or more processors 131 from medium 132 cause processors 131 to perform the processing described herein and below with respect to 133-135.

Each entity server 140 comprises one or more processors 141 and non-transitory computer-readable storage medium 142. Medium 142 comprises executable instructions for a data store interface 143 and internal systems 144. The executable instructions when provided to one or more processors 141 from medium 142 cause processors 141 to perform the processing described herein and below with respect to 143-144.

Terminal 120 performs transactions for selling items. Transaction agent 123 of retailer server 130 processes a transaction purchase workflow that interacts with transaction manager 133 for purposes of completing a transaction to sell an item to a consumer on behalf of a retailer at the retailer store or online (via a web-based or app-based interface—online transactions may utilize a consumer device as terminal 120 (such as consumer phone, tablet, laptop, etc.)).

Transaction manager 133 processes purchase transaction workflows through interaction with transaction agent 123. The purchase transaction workflow is enhanced and modified with the teachings presented herein, such that during purchase transaction, transaction manager 133 notifies transaction manager 113 of the transaction along with transaction data (may also be referred to as transaction details), which is gathered by transaction agent 123 and transaction manager 133 from a retailer's transaction, product/item catalogue, and/or customer loyalty data stores.

Transaction data may comprise, a customer identifier (if available) for the customer associated with the transaction, a customer profile (if available) associated with the customer identifier, item codes for each item (such as Universal Product Code (UPC)) of the transaction, item pricing for each item of the transaction, item category for each item of the transaction, item description for each item of the transaction, a transaction type that identifies an item return transaction versus a purchase transaction, a channel identifier for a channel being used for the transaction (e.g., in person at a POS terminal 120, in person at a SST 120, online via a consumer device acting as terminal 120 through a mobile application of the consumer device, via a call center through an agent that operates a terminal 120, etc.), transaction identifier for the purchase transaction of all of the items being purchased by the customer, a terminal identifier for the terminal 120, a store identifier for the store associated with the item return, geographical location data for the store, planogram data for shelf locations of the items associated with the transaction within the store, a retailer identifier for the retailer, a transaction history for the customer (if available), entity identifiers for the manufacturer, supplier, distributor, and/or CPG associated with the item codes (there may be one to several entity identifiers for a single item being purchased with the transaction), customer demographic data or customer segmentation data for the customer maintained in the loyalty data store (if available), calendar date for the item return, day of the week for the item return, time of day for the item return, a season associated with the calendar date, promotion identifiers for any promotions redeemed with the items of the transaction, promotion details for each redeemed promotion during the transaction.

It is to be noted also terminal 120 may be a mobile device operated by the consumer (consumer device), such that the mobile device reports through transaction agent 123 a current geographical location of the mobile device using the device's location services.

Moreover, transaction data may comprise additional information available to retailer from their data stores or internal systems 134 from what was presented above or less information from what was presented above.

Further, customer profile data (when available) of the item return data may comprise customer contact information (such as mobile device number, email address, social media identifiers, etc.), customer name, customer loyalty level, preferred contact channel of customer (e.g., via email, text, and/or voice call).

Transaction manager 133 sends a transaction identifier for the transaction in real time along with the transaction data/details to transaction/return manager 113 of cloud 110 as items are purchased and the transaction is processed on terminal 120.

Transaction manager 113 indexes, links, and stores the transaction data within data store 116 based on the retailer identifier for the retailer, store identifier, item categories or item types for each item of the transaction, the entity identifiers (for the manufacturer, supplier, distributor, and/or CPG) associated with each entity of each item of the transaction, the items' identifiers (UPCs) for the purchased items of the transaction, any promotion identifiers for any promotions redeemed during the transaction, and/or a customer identifier for the customer (if available).

Each record in data store 115 comprises transaction data or transaction details for the corresponding purchase transaction. Furthermore, some retailers may comprise their own unique entity identifiers for distributors or suppliers, such that transaction/return manager 113 may maintain lookup tables that map a given distributor's or a given supplier's retail-specific entity identifier and associate it to a unique entity identifier for the given distributor or supplier maintained by cloud 110. The manufactured of the purchased items are already assigned unique manufacturer identifiers available within the UPCs (item codes) of the transaction data for the transaction.

In some embodiments, mapping tables to distinguish unique customer identifiers across retailers may also be used by transaction/return manager 113 for purposes of identifying a unique customer across different retailers that is associated with different retailer-assigned customer identifiers. In this embodiment, a globally unique customer identifier for a customer may be maintained and managed by transaction manager 113 across a plurality of retailers.

Correlation/relationship manager 114 derives correlations or relationships within the cross-retailer and cross-entity transaction data of data store 116.

First relationships or correlations are established by correlation/relationship manager 114 between baskets of the transactions. A basket correlates to a given transaction and its corresponding transaction data. Thus, a given basket may comprise a single item or a plurality of items.

The manners in which the first relations are established can vary. For example, a machine-learning algorithm may be trained on the baskets to cluster the baskets together and associate any given item with an optimal basket cluster.

As another example, each item code for each item of a basket is mapped to multidimensional space (in one case, the dimensions of the space may be determined by the available item codes for the items) and the coordinates or all the items within a single basked may then be weighted and/or summed to produce a single basket vector mapped to the multidimensional space (this mathematically represents a context within which each item was purchased within each transaction). The basket vectors are analyzed within the multidimensional space for predefined distances between the plotted basket vectors and any basket vectors within the predefined distances are clustered together. Frequencies of each of the baskets (number of times (occurrences) that a transaction mapped to the basket was processed within data store 116) may also be maintained). The frequencies that each unique item appears in each basket and each of the corresponding basket clusters can also be maintained. These mappings and frequencies can then be used by correlation/relationship manager 114 to derive relationships and correlations, such as a given entity's (E1) product (X) appears in baskets/transactions of retailer R with entity's (E2) product P; the basket cluster comprising items (M) most frequently occur when X is purchased as one of the M; a most frequency occurring basket comprises products X and Y of E1; based on distanced between baskets a customer is predicted to also buy X when a given basket includes Y; etc.

Second relationships or correlations may also be derived using the machine-learning, statistical, and/or the vector-based approaches discussed above. The second relationships can be based on geographical region for items associated with the entity. The region can comprise one or more retail stores associated with a given retailer or associated with different retailers. For example, based on frequency and contexts of baskets within a given region, X is bought most frequency with product Z whereas in another region X is bought most frequently with P, etc.

Third relations or correlations may also be derived using machine-learning, statistical, and/or the vector-based approach discussed above for seasons (calendar date ranges (March to May—spring, June to August—summer, September to November—fall, and December to February—winter). For example, baskets for a given season show a different set or different correlations between the entities product sales, in the fall basket analysis shows a strong correlation between transactions that buy X also buy Z but in winter a strong correlation exists between transaction that buy P also buy Z, etc.

It is to be noted that other custom correlations may be derived based on custom parameters, such as based on Holidays, weather conditions (note for the weather data can be obtained by manager 114 using the transaction calendar date to obtain what the weather data was from a web-based weather service, which is then maintained with the transaction records in the data store 116), etc.

Correlation/relationship manager 114 maintains a custom set of correlations per retailer and per entity within data store 116, which is periodically updated based on newly received transaction data or which is dynamically updated in real time with each new transaction.

These correlations can be provided as recommendations (messages) along with data graphs of the corresponding relevant data that supports the recommendations to the entities through DS interface 143 and to the retailers through DS interface 135. A workflow for each entity and each retailer can provide the conditions under which the messages are provided by manager 114 to the corresponding entity and the corresponding retailer, such as when a previous correlation changes beyond a threshold, when a new correlation is discovered, etc.

Transaction integration service 115 receives notification from transaction manager 113 upon insertion of a purchase transaction Note that this notification may also be detected by transaction integration service 115 based on monitoring the data store 116 for insertion of records. The corresponding record from the data store 116 is obtained and the retailer identified along with the entity identifiers (manufacturer identifier available from the UPC (item code) whereas other types of entities (supplier, distributor, or CPG) may require a mapping table lookup based on the retailer identifier for the record that was added to the data store 116).

Transaction integration service 115 identifies the transaction type of the record and determines when a transaction type is a purchase transaction as opposed to an item return transaction. Transaction integration service 115 access workflows for each of the entities and each of the retailers identified in the record associated with a transaction type of the purchase transaction and transaction integration service 115 processes each of the workflows using the record. Note that one to several workflows may be processed by integration service 115 and the exact number of workflows is dependent on the entity/retailer identifiers and corresponding entities/retailers having registered a workflow with cloud 110. At least one workflow is processed for one of the entities. The entities' purchase transaction workflows are customized by or for each entity.

As an example, a given distributor entity workflow associated with the item return may instruct the integration service 115 to query the data store 116 and tabulate all purchase of item X from a given retail store within a current interval of time (such as one day, past 12 hours, past three days, past week, past month) and report the tabulated total along with the corresponding item identifier and any select information for each of the corresponding records (such as a promotion redeemed or not and what promotion was redeemed if any) when the tabulated total exceeds a predefined threshold before the current interval of time expires. When the tabulated total never exceeds the predefined threshold within the current interval of time, the workflow instructs integration service 114 to report current tabulated totals and the select information from the corresponding records at the expiration of the current interval of time.

Integration service 114 may report the totals and any select information/data directly to the internal systems 134 and 144 of the corresponding retailers and entities via Application Programming Interfaces (APIs) associated with the systems 134 and 144 based on the instructions of the purchase transaction workflows. The tabulated totals may be per unique item identifier, per retailer, per geographical region or location that spans multiple different stores of a same retailer or spans multiple different stores of different retailers, and/or per any custom aggregation with custom conditions and/or customer intervals of time/threshold totals defined by the retailer of the entity within the workflow. Moreover, the workflow may define the format and types of data that is to be reported to the internal systems 134 and 144 via the APIs by integration service 115.

Each entity workflow can custom define what event and/or what item return total (per specific item or per aggregates of different items) triggers a report out by integration service 115 to internal systems 134 and 144. Specific retailer/entity defined conditions and time intervals can also be defined before a report out is triggered.

The internal systems 134 and 144 may comprising inventory systems, loyalty/promotion systems, schedule/delivery systems, ordering systems, etc. This allows for integration of real-time purchase transaction within each internal system 134 and 144.

Thus, integration service 115 acts as a real-time monitor of purchase transaction for each interested retailer and entity and when retailer/entity-defined conditions are met, aggregated information and select record data can be delivered as input to the retailer's/entity's internal systems 134 and 144. This allows inventory, scheduling, truck loading, manufacture of items, order of items, and truck routes to account in the optimization processing for real-time relevant transaction data.

System/Platform 100 is completely automated and processed in real time and is employed via data store 116. Data store 116 is maintained and custom mined (based on each retailer's/entity's purchase transaction workflow) by transaction/return manager 113 and transaction integration service 115. At the same time, correlation/relationship manager 144 continuously discovers new correlations and updates existing correlations for each retailer/entity using data store 116. Correlation/Relationship manager 114 delivers recommendations to the corresponding retailers and entities when triggered conditions (which can be defined in its own workflow or workflow per retailer or per entity). That is, a single workflow can be used by manager 114 to decide when a recommendation is sent, or each retailer/entity may have its own workflow that is customized for when recommendations are sent by manager 114. So, in some embodiments, each retailer/entity comprises at least two workflows; one for purchase transactions and one for when and what recommendations are sent to the corresponding DS interface 135 and 143.

In an embodiment, a recommendation sent by manager 114 to a given DS interface 135 or 143 identifies that multiple different items should be located adjacent to one another or in proximity to one another within a given retail store based on the corresponding basket analysis.

In an embodiment, a recommendation sent by manager 114 to a given DS interface 134 of 143 identifies that two different items would sell better if bundled together as a pair based on the corresponding basket analysis.

In an embodiment, a recommendation is sent by manager 114 as a competitive analysis graph or set of data that shows one entity's basket or transaction penetration versus a competing entity's basket of transaction penetration within a given store or within a given collection of stores within a region that is associated with multiple different retailers.

In an embodiment, a recommendation is sent by manager 114 as a seasonal analysis graph or set of data that shows one entity's item sales by item type per season or per location within a given season.

In an embodiment, a customized workflow for a given retailer/entity may instruct integration service 115 to generate and deliver a report for a given item purchased or a custom aggregation of item purchases to interface 135/143 and/or to a designated resource address (such as to email, text number, social media account via private messaging, etc.).

In an embodiment, the customized purchase transaction workflow processed by integration service 115 may just report selective transaction data and/or selective aggregated transaction data to a designated resource address, to interface 135/143, to internal systems 134/144 via an API via an API, and/or to any combination or all of these things based on a given purchase transaction or based on a collection of purchase transactions.

Control over what transaction is reported out (how much of the transaction data and/or aggregations of transaction data), to whom the data is reported out (resource address, interface 135/143, and/or internal system 134/144), how the data is reported out (format and types of data, API, and when the data is reported out (conditions or events)) may all be custom defined for a given retailer/entity within purchase transaction workflow and automatically processed and monitored in real time by integration service 115.

Additionally, both the retailers and the entities can access data store 116 and perform queries and generate reports via interface 135 of retailer servers 130 and via interface 143 of entity servers 140. That is, a user-facing interface to integration service 115 is provided through interface 135 to the retailers and is provided through interface 143 to the entities. The retailers and entities can provide custom search criteria through the user-facing interface to integration service 115. Integration service 115 then processes the search criteria against data store 116 and returns search results back to the entities or retailers via interfaces 143 and 135.

It is to be noted that data store 116 can be organized in any number of manners, such as via tables by retailer, tables by store of retailer, tables by entity, tables by type of item, etc.

When integration service 115 processes the workflows, the appropriate tables needed that span multiple different retailers/entities or that are associated with just one retailer/entity or store of the retailer can be searched selectively. In this manner, transaction identifiers are unique for a given retailer or a given store within a given table, but the integration service 115 can search across multiple different tables associated with multiple different retailers/entities when conditions defined in a retailer/entity workflow dictate.

Each entity or retailer can have custom workflows for both item returns and purchase transactions. For example, an entity may have an item return workflow that notifies transaction manager 133 when a predefined total of number of items of a specific type are returned within an entity-set period of time. This can assist the entity in truck load planning and truck route planning. This is but one example and it is to be understood that a variety of retailer and entity-based needs can drive their item return workflows and purchase transaction workflows.

Transaction/Return manager 113, correlation/relationship manager 114, transaction integration service 115, and data store 116 collective present and provide a cross-entity recommendation service to the retailers and the entities (providing the features and functions discussed herein). This allows transaction information to be timely processed and fed to retailer/entity-based systems 134/144 to adjust for purchase transactions and to receive recommendations to optimize purchases of their items.

These and other embodiments are now discussed with reference to FIGS. 2-3.

Figure 2:
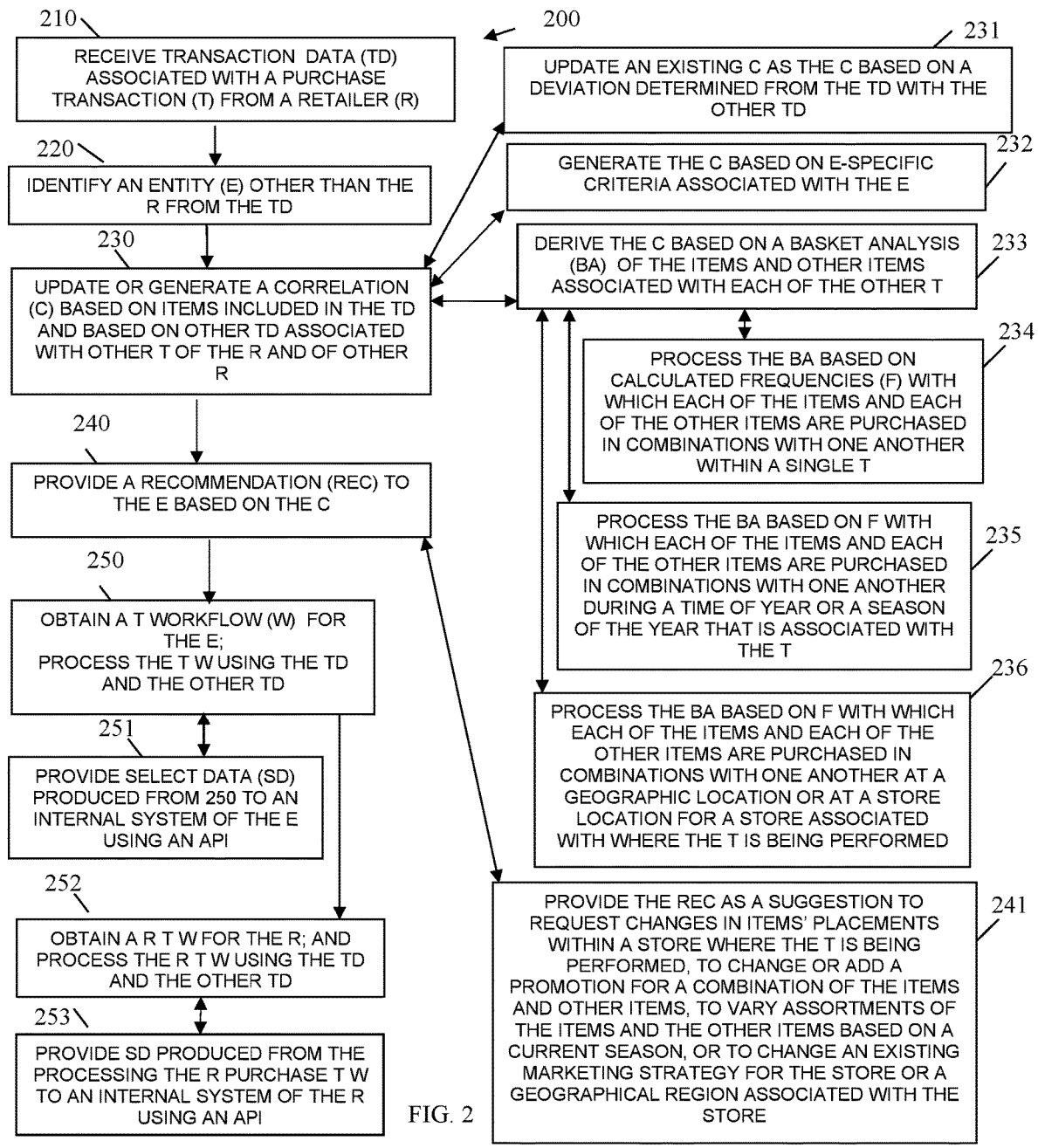
FIG. 2 is a diagram of a method for operating a cross-entity recommendation service, according to an example embodiment.

FIG. 2 is a diagram of a method 200 for operating a cross-entity recommendation service, according to an example embodiment. The software module(s) that implements the method 200 is referred to as a "cross-entity/retailer recommendation service." The cross-entity/retailer recommendation service is implemented as executable instructions programmed and residing within memory and/or a non-transitory computer-readable (processor-readable) storage medium and executed by one or more processors of one or more devices. The processor(s) of the device that executes the cross-entity/retailer recommendation service are specifically configured and programmed to process the cross-entity/retailer recommendation service. The cross-entity/retailer recommendation service may have access to one or more network connections during its processing. The network connections can be wired, wireless, or a combination of wired and wireless.

In an embodiment, the device that executes the cross-entity/retailer recommendation service is cloud 110. In an embodiment, cloud 110 comprises a plurality of servers logically cooperating and accessible as a single server 110 (cloud 110).

In an embodiment, the cross-entity/retailer recommendation service is all or some combination of 113-115.

At 210, the cross-entity/retailer recommendation service receives transaction data with a purchase transaction from a retailer.

At 220, the cross-entity/retailer recommendation service identifies an entity other than the retailer from the transaction data.

At 230, the cross-entity/retailer recommendation service updates or generates a correlation based on items included in the transaction data and based on other transaction data associated with other transactions of the retailer and other retailers.

In an embodiment, at 231, the cross-entity/retailer recommendation service updates an existing correlation as the correlation based on a deviation determined from the transaction data with the other transaction data.

In an embodiment, at 232, the cross-entity/retailer recommendation service generates the correlation based on entity-specific criteria associated with the enterprise.

In an embodiment, at 233, the cross-entity/retailer recommendation service derives the correlation based on a basket analysis of the items and other items associated with each of the other transactions.

In an embodiment of 233 and at 234, the cross-entity/retailer recommendation service processes the basket analysis based on calculated frequencies with which each of the items and each of the other items are purchased in combinations with one another within a single transaction.

In an embodiment of 233 and at 235, the cross-entity/retailer recommendation service processes the basket analysis based on calculated frequencies with which each of the items and each of the other items are purchased in combinations with one another during a time of year or a season of year that is associated with the transaction.

In an embodiment of 233 and at 235, the cross-entity/retailer recommendation service processes the basket analysis based on calculated frequencies with which each of the items and each of the other items are purchased in combinations with one another at a geographical location or at a store location for a store associated with where the transaction is being performed.

At 240, the cross-entity/retailer recommendation service provides a recommendation to the entity based on the correlation.

In an embodiment, at 241, the cross-entity/retailer recommendation service provides the recommendation as a suggestion to request changes in items' placements within a store where the transaction is being performed, to change or to add a promotion for a combination of the items and other items associated with the other transactions, to vary assortments of the items and the other items based on a current season associated with the transaction, and/or to change an existing marketing strategy for the store or for a geographical region associated with the store where the transaction is being performed.

In an embodiment, at 250, the cross-entity/retailer recommendation service obtains a transaction workflow for the entity and processes the transaction workflow using the transaction data and the other transaction data associated with the other transactions.

In an embodiment of 250 and at 251, the cross-entity/retailer recommendation service provides select data produced at 250 to an internal system of the entity using an API.

In an embodiment of 250 and at 252, the cross-entity/retailer recommendation service obtains a transaction workflow for the retailer and processes the retailer transaction workflow using the transaction data and the other transaction data associated with the other transactions.

In an embodiment of 252 and at 253, the cross-entity/retailer recommendation service provides select data produced from 252 to an internal system of the retailer using an API.

Figure 3:
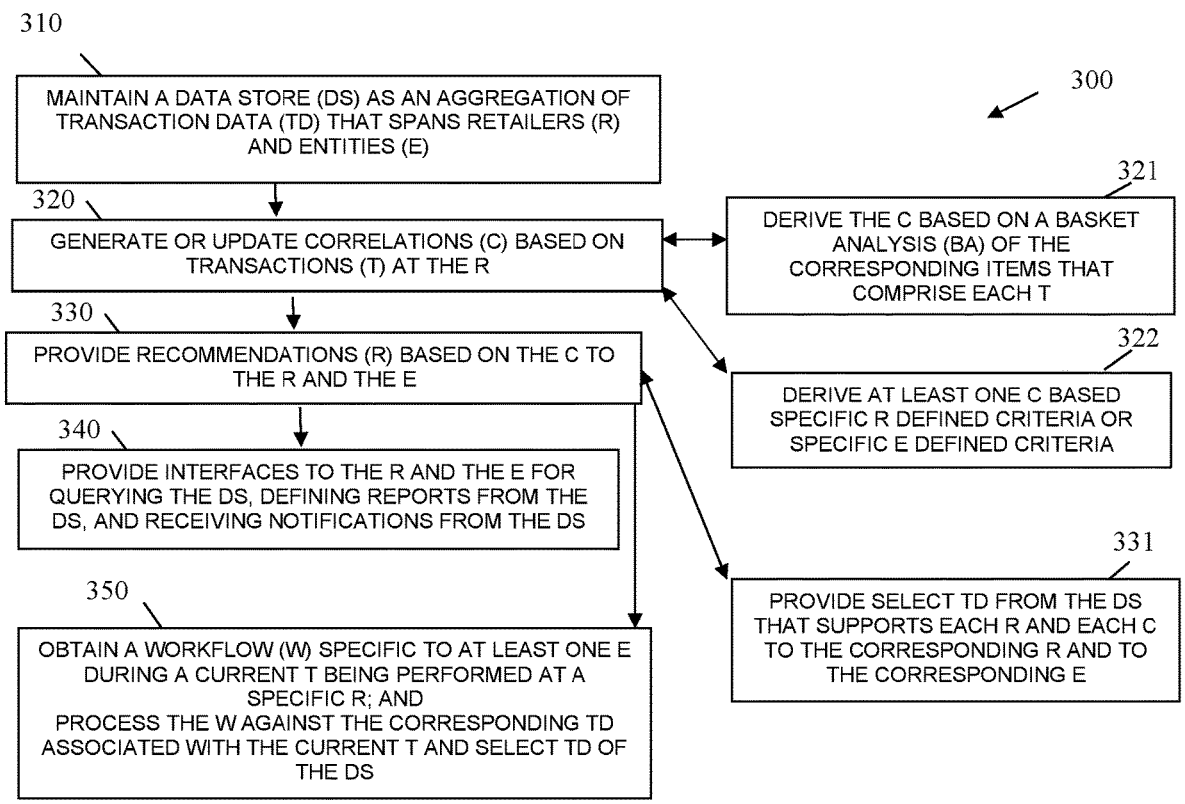
FIG. 3 is a diagram of another method for operating a cross-entity recommendation service, according to an example embodiment.

FIG. 3 is a diagram of another method 300 for operating a cross-entity recommendation service, according to an example embodiment. The software module(s) that implements the method 300 is referred to as a "cloud-based cross entity and cross retailer recommendation service." The cloud-based cross entity and cross retailer recommendation service is implemented as executable instructions programmed and residing within memory and/or a non-transitory computer-readable (processor-readable) storage medium and executed by one or more processors of a device. The processors that execute the cloud-based cross entity and cross retailer recommendation service are specifically configured and programmed for processing the cloud-based cross entity and cross retailer recommendation service. The cloud-based cross entity and cross retailer recommendation service may have access to one or more network connections during its processing. The network connections can be wired, wireless, or a combination of wired and wireless.

In an embodiment, the device that executes the cloud-based cross entity and cross retailer recommendation service is cloud 110. In an embodiment, the device that executes the item return transaction integration manager is server 110.

In an embodiment, the cloud-based cross entity and cross retailer recommendation service is all of or some combination of 113-115 and/or method 200 of FIG. 2.

The cloud-based cross entity and cross retailer recommendation service presents another and, in some ways, enhanced processing perspective of the what was discussed above for cloud 110 and method 200.

At 310, the cloud-based cross entity and cross retailer recommendation service maintains a data store as an aggregation of transaction data that spans retailers and entities.

At 320, the cloud-based cross entity and cross retailer recommendation service generates, or updates correlations based on transactions at the retailers.

In an embodiment, at 321, the cloud-based cross entity and cross retailer recommendation service derives the correlations based on a basket analysis of the corresponding items that comprise each transaction.

In an embodiment, at 322, the cloud-based cross entity and cross retailer recommendation service derives at least one correlation based on specific retailer-defined criteria or specific entity-defined criteria.

At 330, the cloud-based cross entity and cross retailer recommendation service provides recommendations based on the correlations to the retailers and the entities.

In an embodiment, at 331, the cloud-based cross entity and cross retailer recommendation service provides select transaction data from the data store that supports each recommendation and each correlation to the corresponding retailers and the corresponding entities.

In an embodiment, at 340, the cloud-based cross entity and cross retailer recommendation service provides interfaces to the retailers and the entities for querying the data store, defining reports from the data store, and receiving notifications from the data store.

In an embodiment, at 350, the cloud-based cross entity and cross retailer recommendation service obtains a workflow specific to one of the entities during a current transaction being performed at a specific retailer and the cloud-based cross entity and cross retailer recommendation service processes the workflow against the corresponding transaction data associated with the current transaction and select transaction data of the data store.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving, by a processor of a server, transaction data associated with a purchase transaction from a retailer;
   identifying, by the processor, an entity other than the retailer from the transaction data;
   updating or generating, by the processor, a correlation based on items included in the purchase transaction data and based on other transaction data associated with other purchase transactions of the retailer and of other retailers, wherein updating or generating further includes updating an existing correlation as the correlation based on a deviation determined from the transaction data with the other transaction data; and
   providing, by the processor, a recommendation to a system of the entity via an application programming interface (API) based on the correlation and providing data graphs corresponding to relevant data that supports the recommendation through an interface accessible to the entity based on the correlation, wherein the recommendation relevant to increasing sales of at least one of the items by the entity through the retailer.

2. The method of claim 1 further comprising:
   obtaining, by the processor, a purchase transaction workflow for the entity; and
   processing, by the processor, the purchase transaction workflow using the transaction data and the other transaction data.

3. The method of claim 2 further comprising:
   providing, by the processor, select data produced from the processing to an internal system of the entity using the API.

4. The method of claim 2 further comprising:
   obtaining, by the processor, a retailer purchase transaction workflow for the retailer;
   processing, by the processor, the retailer purchase transaction workflow using the transaction data and the other transaction data.

5. The method of claim 4 further comprising:
   providing, by the processor, select data produced from the processing of the retailer purchase transaction workflow to an internal system of the retailer using the API.

6. The method of claim 1, wherein updating or generating further includes generating the correlation based on entity-specific criteria associated with the entity.

7. The method of claim 1, wherein updating or generating further includes deriving the correlation based on a basket analysis of the items and other items associated with each of the other purchase transactions.

8. The method of claim 7, wherein deriving further includes processing the basket analysis based on calculated frequencies with which each of the items and each of the other items are purchased in combinations with one another within a single purchase transaction.

9. The method of claim 7, wherein deriving further includes processing the basket analysis based on calculated frequencies with which each of the items and each of the other items are purchased in combinations with one another during a time of year or a season of the year that is associated with the purchase transaction.

10. The method of claim 7, wherein deriving further includes processing the basket analysis based on calculated frequencies with which each of the items and each of the other items are purchased in combinations with one another at a geographic location or at a store location for a store associated with where the purchase transaction is being performed.

11. The method of claim 1, wherein providing further includes providing the recommendation as a suggestion to request changes in items' placements within a store where the purchase transaction is being performed, to change or add a promotion for a combination of the items and other items associated with each of the other purchase transactions, to vary assortments of the items and the other items based on a current time of year or a current season of the year associated with the purchase transaction, or to change an existing marketing strategy for the store or a geographical region associated with the store.

* * * * *